United States Patent [19]

Hajagos, deceased et al.

[11] 3,995,583
[45] Dec. 7, 1976

[54] CONTINUOUS LIQUID CURING SYSTEM FOR THE MANUFACTURE OF INSULATED CONDUCTORS

[75] Inventors: Michael Stephen Hajagos, deceased, late of Toronto, Canada, by Elizabeth Jean Hajagos, executrix; Robert Zeidenberg, Willowdale, Canada; Edward Frank Davis; Joseph Halasz, both of Toronto, Canada; Robert Dormany, Guelph, Canada

[73] Assignee: Canada Cable and Wire Limited, Toronto, Canada

[22] Filed: Mar. 13, 1975

[21] Appl. No.: 558,154

Related U.S. Application Data

[62] Division of Ser. No. 296,315, Oct. 10, 1972, Pat. No. 3,903,327.

[30] Foreign Application Priority Data

Apr. 10, 1972  Canada .............................. 139359

[52] U.S. Cl. .................................. 118/46; 118/47; 118/67; 118/69; 118/DIG. 5
[51] Int. Cl.² ........................................ B05C 11/00
[58] Field of Search ............... 118/47, 67, 69, 410, 118/DIG. 22, DIG. 18, 46; 264/174, 178; 428/389

[56] References Cited

UNITED STATES PATENTS

| | | | |
|---|---|---|---|
| 2,287,489 | 6/1942 | Skoning | 118/DIG. 22 |
| 2,732,592 | 1/1956 | Tunnicliff et al. | 264/174 |
| 3,051,992 | 9/1962 | Bradley | 264/178 |
| 3,802,913 | 4/1974 | MacKenzie, Jr. | 428/389 |

Primary Examiner—Dorsey Newton
Attorney, Agent, or Firm—Spencer & Kaye

[57] ABSTRACT

Apparatus is provided for continuous manufacture of insulated conductors and includes an extruder and an elongated chamber having a first curing section immediately following the extruder and a second cooling section following the first section. Both sections are substantially filled with a same liquid medium which remains liquid under both curing and cooling conditions. Means are provided for continuously advancing an electric conductor through the extruder wherein a coat of a curable insulating material is applied thereon and then into and through the chamber filled with the liquid medium. The apparatus further includes means for maintaining the liquid medium in the chamber under sufficient pressure to produce void free insulation, and means for maintaining the liquid medium in the first section of the chamber at a temperature at which the insulating material is cured, and in the second section of the chamber at a cooler temperature to cool the cured insulating material. The system is simple, efficient and inexpensive. It is also easily adaptable to continuous plant operations in the wire and cable industry.

12 Claims, 1 Drawing Figure

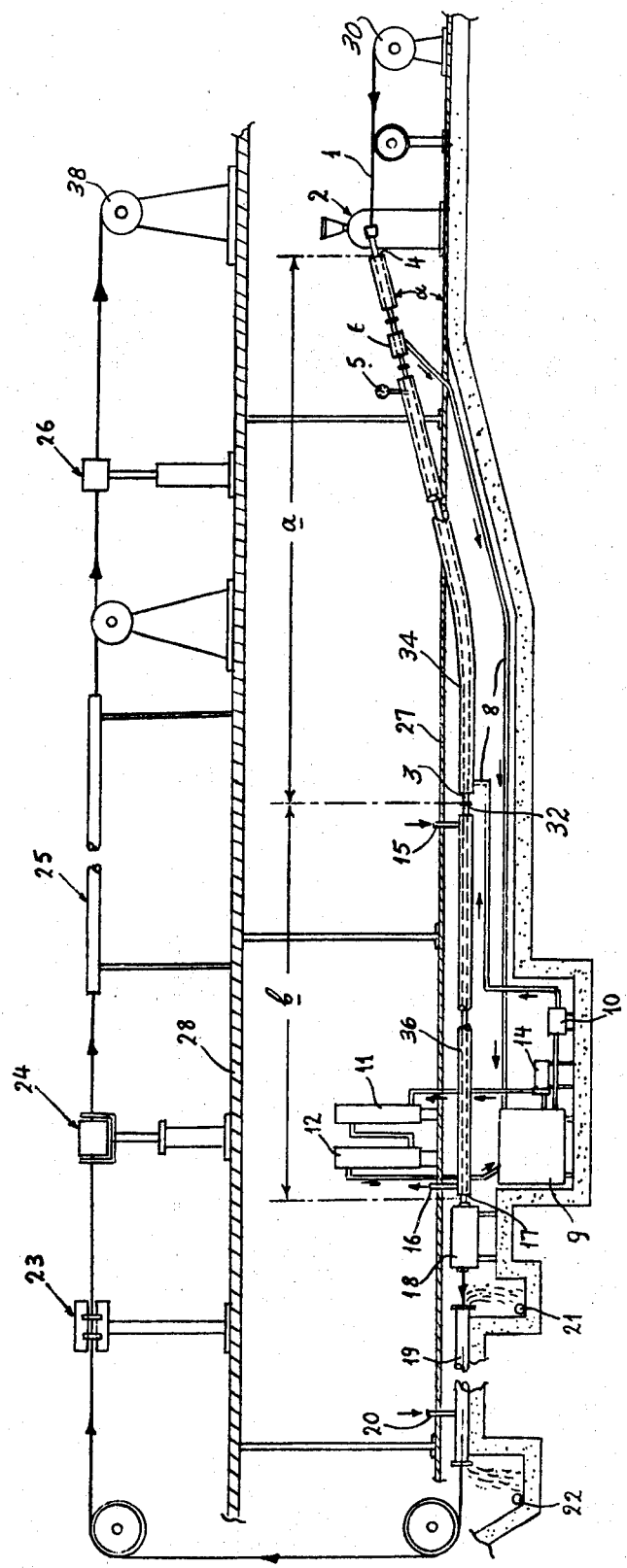

CONTINUOUS LIQUID CURING SYSTEM FOR THE MANUFACTURE OF INSULATED CONDUCTORS

CROSS REFERENCE TO RELATED APPLICATION

This application is a division of copending application Ser. No. 296,315, filed Oct. 10, 1972, now U.S. Pat. No. 3,903,327.

This invention relates to a novel continuous liquid curing system for the manufacture of insulated electric conductors, such as wires and cables. It includes a novel continuous method of insulating such conductors through extrusion of an appropriate insulating material thereon and then curing of the insulating material in a liquid medium under pressure, followed by cooling, to produce the desired void free insulated conductor.

It also includes a novel apparatus for continuously insulating electric conductors in a liquid curing medium. In addition, it provides a possibility of washing the resulting conductors and burning off the curing liquid remaining on the insulation and then painting the latter and, if desired, printing, all on the same continuous line.

It has been known for some time that in order to produce void free insulation on electric conductors, such as wires and cables, it is necessary to cure the insulated conductors and then cool them under pressure. For example, Canadian Pat. No. 485,125 issued July 22, 1952 to John Krauss Webb, clearly recognizes this fact and suggests a solution whereby the cable is cured in a steel tube filled with water, heated by steam, and subjected to high pressure. After remaining at the specified temperature and pressure for some hours, the steam is shut off and the cable allowed to cool slowly with the pressure still maintained. After room temperature is reached, the pressure is released and the steel tube emptied of water. Thereafter, the steel tube may be evacuated and the cable left in vacuo for some hours or even days. Only then the cable is removed from the steel tube, wound on a drum and stored from some days or weeks. After all this, the above procedure is repeated on the same cable to produce void free insulation.

Such procedure is rather cumbersome and time consuming and, in addition, it is not applicable to a fully continuous manufacture of insulated conductors.

A more recent development described and claimed in Canadian Pat. No. 848,849 of Aug. 11, 1970, issued to Peter Nicholson, provides a way of manufacturing insulated electric cables in a continuous manner. This is done by fitting the extruder with a special tube into which steam under pressure is injected so as to cause the extruded insulation to collapse firmly on the cable as it emerges from the extrusion machine, but without forcing the extruded insulator back along the tube. Thereafter, the insulated cable is introduced into an inclined hermetically sealed curing chamber filled with steam under superatmospheric pressure at its upper end while having cooling water at its lower end. After withdrawal from this chamber, the insulated cable travels through vessels of cooling fluid before it is wound on a take-up drum.

This method is rather complex because it requires a special extruder and a close control of the pressure difference at the extrusion orifice. The curing chamber must also be supplied with two media, one being steam at superatmospheric pressure and the other being water at the same pressure. Thus, the curing chamber must be provided with a steam tight seal at its inlet end, close to the extruder, and with a water-tight seal at its outlet end where the insulated cable leaves the curing vessel. All these conditions are rather complicated and require constant supervision. Thus, this particular method is rather expensive and has not achieved much popularity in the wire and cable industry.

It is therefore an object of the present invention to obviate the complexities and practical disadvantages of the known systems by providing a novel method and apparatus, which employ only one liquid medium in the curing and cooling chamber and which can be used with any conventional extruder, requiring no special pressure control and no particular supervision. Consequently, the novel system is simpler and less expensive and is well adaptable to continuous plant operations in the wire and cable industry.

A still further object of this invention is to achieve the curing, cooling, cleaning, painting and, if desired, printing operations, in a single continuous line without any interruption of the predetermined sequence. This is of particular practical interest and, to our knowledge, has never been achieved up to now.

Other objects and advantages of the invention will be apparent from the following more detailed description thereof.

Basically, the invention provides a novel method for continuous manufacture of insulated conductors which comprises: extruding onto a continuously advancing conductor an extrudable and curable insulating material so as to cover said conductor with a predetermined coat of said insulating material; then curing and cooling said insulating material on the coated conductor in an elongated curing-cooling chamber provided with a liquid medium under sufficient pressure to produce void free insulation; and maintaining in the liquid medium in said chamber a temperature gradient such that the coated conductor is first cured and then cooled in the same liquid medium under pressure.

The conductor can be an electric wire or cable which is bare or which has previously been precoated or pretreated in some desired manner. The extrudable and curable insulating materials are well known in the art and usually consist of cross-linkable compounds of polyethylene, polyvinylchloride and the like. These compounds may include additives such as carbon black in various proportions and, of course, they include cross-linking agents such as dicumylperoxide and the like. Other examples of such compounds are elastomers such as neoprene compounds, ethylene-propylene compounds, styrenebutadiene rubber compounds and the like. For the puroposes of the present invention, these compounds must be extrudable and curable in a liquid medium.

The liquid media that can be used in accordance with the present invention for curing and cooling of the insulating material on the coated conductor includes all heat transfer liquids that will achieve curing of the insulating material at predetermined temperatures and which are consequently heat stable at those tempratures. Particularly suitable are organic substances which are heat stable at temperatures up to about 600° F. Other such substance is a glycol such as polyalkylene glycol which may contain a heat stabilizing antioxidant. It is relatively non volatile and heat stable at temperatures of about 400-500° F and has a flash point above 500° F. Other such liquids are, for example, propylene glycol and glycerol as well as esters thereof.

The liquid meduim is maintained in the curing-cooling chamber under sufficient pressure to produce void free insulation. The term "void free" as used herein, means an insulation without any porosity or pin holes or voids that could be seen by the naked eye.

Generally, pressures between about 15 and 100 psig are adequate. Preferred pressures are between 20 and 50 psig simply because above 50 psig special pressure resistant materials are needed for the construction of the curing-cooling chamber. It has been found that in most cases, with pressures below 15 psig inadequate insulation will be obtained, which will have porosity, voids and pin holes therein.

The temperature gradient between the curing and the cooling sections of the elongated chamber can be maintained according to one embodiment of the present invention by constant recirculation of the liquid medium in the curing section while keeping the liquid medium substantially stationary in the cooling section. During recirculation, the liquid medium is preheated to the desired temperature. The recirculating pump will usually be a suitable pressure pump and will be employed to provide the liquid medium with the desired pressure. The temperature in the curing section will preferably be maintained at about 400-500°F and in the cooling section at about 50-200°F.

The insulated conductor cured and cooled within the elongated chamber will be withdrawn thereform through a liguid tight pressure seal of any conventional or known design and then will usually be washed and further cooled in cold water. It is preferred to use a stream of cold water within an elongated pipe for this purpose, since this gives a better washing action. Thereafter, the remainging traces of the curing liquid may be burning off the insulation and the insulated conductor may then be subjected to a painting operation. This painting operation may consist of the application of one or more coats of paint onto the advancing insulated conductor. Thereafter, the insulated conductor with the paint thereon is passed through a heater where the paint is dried and then a desired print may be applied thereon, to indicate the type of the conductor, the company name, or the like. All these steps, in accordance with the present invention, are carried out in a continuous sequence of operations without any interruption whatsoever.

Finally, after the printing operation, the conductor is wound on a take-up reel.

The above operations can all be carried out at a satisfactory speed involving no stoppage anywhere in the circuit. The speed will depend on many factors, the primary one being the curing rate of the material. Such curing rate depends on the insulating material employed, on the crosslinking agent used with said insulating material, on the temperatures and pressures in the curing chamber and the like. All these parameters can be easily adjusted and controlled by a man familiar with the art. Generally speaking, however, curing rates between 100 and 200 feet per minute can be attained in accordance with the present invention and they would substantially correspond to the operational speed of the system.

The apparatus in accordance with the present invention will generally comprise: an extruder and an elongated curing-cooling chamber substantially filled with a liquid medium; means for continuously advancing an insulated conductor through said extruder wherein a coat of a curable insulating material is applied thereon and then into and through said curing-cooling chamber filled with the liquid medium; means for maintaining said liquid medium in said chamber under sufficient pressure to produce void free insulation; and means for maintaining said liquid medium in a first section of said chamber, immediately following the extruder, at a temperature adapted to cure said insulating material, and in a second section of said chamber, following said first section, at a temperature adapted to cool the cured insulating material.

The extruder employed within the apparatus of this invention may be of any conventional type suitable for the purpose. At least the first section of the elongated chamber is preferably downwardly sloping at a predetermined angle. The preferred angle is between about 4 and 6° from the horizontal, however depending on the weight of the conductor, the length of the chamber as well as other variables, angles of up to and in excess of 25°from the horizontal can be used. The elongated chamber is preferably of a tubular or pipe-like shape.

The apparatus in the preferred embodiment will also be provided with circulating means for recirculation of the liquid medium in the first section of the elongated chamber, which would include heating means for maintaining said liquid medium at a predetermined temperature. The first section of said elongated chamber will also be usually heat insulated. The circulating means will also usually include a pressure pump for maintaining the liquid medium in the chamber at a predetermined pressure.

The second section of said elongated chamber, wherein the insulated conductor is cooled, will usually be provided with a cooling jacket around it.

When the first section of the elongated chamber is downwardly sloping, it is only necessary to fit the exit end of the elongated chamber with a liquid tight pressure seal because the slope of the first sloping section can be so adjusted as to maintain a desired pressure within said chamber through the rise in level and without the necessity of using any seal other than a breech between the upper end of the sloping tubular chamber and the extruder head. However, at the lower exit end a pressure seal is, of course, necessary. This pressure seal may be of any known or conventional construction which will enable emergence of the insulated conductor from the chamber without permitting the liquid medium under pressure to escape at the same time. For instance, mechanical seals made of rubber backed up by a compressed air ram, will usually effectively prevent the escape of pressurized liquid while permitting withdrawal of the insulated conductor. Many such seals are known in the art and it is therefore unnecessary to describe them in greater detail.

According to further embodiments of the present invention, the apparatus may additionally be provided with means for subjecting the insulated conductor, coming out of the elongated chamber, to the action of a stream of cold water for washing and additionally cooling the same. Furthermore, the apparatus may be provided with a burner station, a painting station and a drying station on the same operational line and means for advancing the insulated conductor through these stations. Thus, the remaining traces of the curing liquid on the insulation are burned off, then the insulated conductor is painted and the paint is dried thereon. Finally, there may be provided a printer on the same operational line and means for advancing the painted conductor therethrough to apply a desired printing on the conductor prior to its winding on a take-up reel.

The invention will now further be described with reference to the appended drawing which illustrates schematically the preferred embodiments of the present invention.

The only FIGURE of the drawing is basically a diagrammatic elevation view of the entire preferred system of the present invention for continuous manufacture of insulated electrical conductors. It is, however, not limitative in nature.

As shown in this FIGURE, advancing conductor 1 continuously passes through extruder 2 wherein a coat of a curable insulating material is applied thereon so as to form around conductor 1 a predetermined coat of said insulating material. Electrical conductor 1 may be a wire or a cable of any desired type. Thus, it may be a bare wire or cable which is simply unwound from a pay-off reel 30 or it may be a wire or cable that has been pretreated in some desired manner.

Upon leaving extruder 2, conductor 1 enters a curing-cooling chamber 3 which is in the form of a long pipe. This pipe 3 consists of a curing section $a$ and a cooling section $b$ which is shown in the drawing as being joined by a joint 32 and is substantially filled with a suitable liquid medium. According to a preferred embodiment of the present invention, at least part of section $a$ is inclined downwardly at an angle $\alpha$ from the horizontal.

The entrance end 4 or pipe 3 is usually sealed to the extruder head by a breech and enables direct entrance into pipe 3 of conductor 1 onto which a predetermined coat of the insulating material has been applied by extruder 2. The liquid medium is under pressure in pipe 3 and the pressure is measured by means of pressure gauge 5. It is also preferred to provide an observation window 6 at the upper end of section $a$ of pipe 3 so as to be able to observe the level of the liquid medium at this point. Angle $\alpha$, which is usually between 4° and 6°, although in some instances it may be much greater, and the pressure within pipe 3, will be adjusted so that the liquid cannot overflow through the entrance end 4 and this can be easily controlled through observation window 6. Any gases produced within pipe 3 may be vented through return section of pipe 8 which recirculates the liquid medium to reservoir 9.

Section $a$ of pipe 3 is heat insulated by heat insulation 34 and the liquid medium therein is at a temperature of between about 400 and 500° F and at a pressure of between about 15 and 100 psig. These figures are, however, not limitative and the desired temperature and pressure conditions will depend on the intended result and on the type of materials and conditions employed and on the structural strength of pipe 3 itself.

The liquid medium which in this case is called "glycol" is circulated through recirculation line 8 into and from reservoir 9. In a particular example, a 180 gallon insulated reservoir was used, provided with a steam coil therewithin for preheating the glycol. From this reservoir 9, the glycol is pumped by pressure pump 10 into section $a$ of pipe 3 so that it will be in said pipe at a predetermined pressure (for example between 20 and 50 psig). The glycol is also at a temperature of between about 400 and 500° F. To maintain this temperature, in addition to the steam coil contained within reservoir 9, the glycol is continuously recirculated through heaters 11 and 12 by means of circulation pump 14. In our particular example, we used a circulation pump of 30 gallons per minute capacity with high temperature seal and electric heaters of 575 volts - 15 kilowatts type having temperature sensing elements of 200-550° F. These figures are, however, given only in the form of a specific example and are in no way limitative.

Consequently, due to continuous circulation through heaters 11 and 12 and then through the circulating line 8 and section $a$ of pipe 3, the liquid medium is maintained at a desired predetermined temperature without any difficulty. The desired pressure in section $a$ of pipe 3 is also maintained at a desired level simply by the use of an appropriate pressure pump 10.

It will be noted that this circulation system does not affect section $b$ of pipe 3 where the liquid medium simply enters into such section through joint 32 and is maintained substantially stationary at the same pressure as in section $a$. This section $b$ is provided with a cooling jacket 36 wherein cooling water is circulated. For this purpose a cooling water inlet 15 and outlet 16 are provided.

The length of sections $a$ and $b$ of curing-cooling pipe 3 may vary depending on the operational conditions, the speed of travel of electricl conductor 1 and the like. As a specific example, we have used 80 feet of pipe for section $a$ and 77 feet for section $b$. These pipes may, of course, be assembled in any desired manner. To the exit end 17 of section $b$ of pipe 3, there is attached a liquid tight pressure seal 18 which enables withdrawal of cured and cooled electric conductor 1 from pipe 3 without allowing undue escape of the liquid medium. As already mentioned above such seal arrangements are generally known and a good mechanical seal made of rubber backed up by a compressed air ram effectively prevents escape of the liquid medium while permitting withdrawal of the insulated electrical conductor.

Thereafter, the insulated conductor is preferably passed through pipe 19 open at both ends and into which a stream of water is injected at 20. This stream of water washes the insulated conductor and further cools the same. The water exits from pipe 19 through each end and flows into drains 21 and 22.

Thereafter, the conductor may be advanced through a burner station 23 wherein the remaining traces of the liquid medium such as glycol are removed by burning them off. Then, such conductor may be passed through one or a plurality of painting stations 24 wherein its insulation is painted as desired. Following this operation, the conductor will usually be passed through an elongated heater 25 so that the paint may be dried. Finally, printer 26 may imprint upon the painted conductor any desired printing matter before the conductor is wound on a take-up reel 38 which would normally be motorized to advance the conductor through the system It will be realized that from beginning to end, this represents a continuous sequence of operations which are done at the same predetermined speed without any stoppage whatsoever. Various adjustments may be made within the system without stopping or interrupting the same. By installing the greatest portion of cooling-curing pipe 3 and adjacent equipment in a cavity under floor 27 of the plant, while installing other equipment such as burner 23, painter 24, heater 25, etc. on a raised platform 28, a great deal of space is saved which can be used for storage and the like. Consequently, the curing system according to the present invention actually takes little useful plant space which represents an important additional advantage.

It should, of course, be understood that the invention is not limited to the specifically described and exemplified embodiments but that many modifications obvious to those skilled in the art can be made without departing from the spirit of the invention and the scope of the following claims.

We claim:

1. Apparatus for continuous manufacture of insulated conductors comprising an extruder and an elongated chamber having a first curing section immediately following the extruder and a second cooling section following said first section, both sections being substantially filled with a same liquid medium which remains liquid under both curing and cooling conditions, means for continuously advancing an electric conductor through said extruder wherein a coat of a curable insulating material is applied thereon and then into and through said chamber filled with the liquid medium, means for maintaining said liquid medium in said chamber under sufficient pressure to produce void free insulation, means for maintaining said liquid medium in the first section of said chamber at a temperature at which said insulating material is cured, said last mentioned means including circulating means for recirculation of the liquid medium in said first section of the elongated chamber while the liquid medium is maintained stationary in the second section of the elongated chamber, and means for maintaining the liquid medium in the second section of said chamber at a cooler temperature to cool the cured insulating material.

2. Apparatus according to claim 1, wherein at least said first section of said elongated chamber is downwardly sloping.

3. Apparatus according to claim 1, wherein at least said first section of said elongted chamber is downwardly sloping at an angle of about 4°–6° from the horizontal.

4. Apparatus according to claim 1, wherein said elongated chamber has a tubular shape.

5. Apparatus according to claim 1, wherein a heat insulation is provided around said first section.

6. Apparatus according to claim 5, wherein said means for maintaining said liquid medium in the first section of said chamber at a temperature at which said insulating means is cured include heating means for said liquid medium.

7. Apparatus according to claim 5, wherein said circulating means include a pressure pump which recirculates and maintains the liquid medium in said chamber at said sufficient pressure.

8. Apparatus according to claim 1, wherein said means for maintaining said liquid medium in the second section of said elongated chamber at a cooler temperature is a cooling jacket which is provided around said second section of said elongated chamber.

9. Apparatus according to claim 2, wherein a liquid tight pressure seal is fitted at the exit end of the elongated chamber.

10. Apparatus according to claim 1, further comprising means for subjecting the insulated conductor coming out of the elongated chamber to the action of a stream of cold water for washing and additionally cooling the same.

11. Apparatus according to claim 10, further comprising a burner station, a painting station and a drying station on the same operational line whereby the remaining traces of the curing liquid on the insulation are burned off and then the insulated conductor is painted and the paint is dried thereon.

12. Apparatus according to claim 11, further comprising a printer on the same operational line to apply a desired printing matter thereon, prior to the winding of the final conductor on a take-up reel.

* * * * *